United States Patent [19]

Solimar

[11] Patent Number: 5,073,259
[45] Date of Patent: Dec. 17, 1991

[54] MANHOLE MOUNTED FILTERING SYSTEM FOR SELF-LOADING SEMI-TRAILER

[75] Inventor: Keith F. Solimar, New Brighton, Minn.

[73] Assignee: Solimar Yachts, Fridley, Minn.

[21] Appl. No.: 593,315

[22] Filed: Oct. 1, 1990

Related U.S. Application Data

[63] Continuation of Ser. No. 378,021, Jul. 11, 1989, abandoned.

[51] Int. Cl.⁵ .......................................... B01D 25/50
[52] U.S. Cl. ................................... 210/232; 55/302; 55/341.1; 55/356; 55/385.3; 55/467; 210/241; 210/416.1; 406/171; 414/467
[58] Field of Search .............. 15/340.1; 55/302, 341.1, 55/356, 385.3, 467, 498, 383, 429; 210/172, 241, 416.1, 232; 406/41, 43, 168, 171, 172; 414/467, 507

[56] References Cited

U.S. PATENT DOCUMENTS

| | | | |
|---|---|---|---|
| 3,973,935 | 8/1976 | Moore et al. | 55/341.1 |
| 4,017,281 | 4/1977 | Johnstone | 406/172 |
| 4,264,345 | 4/1981 | Miller | 55/341.1 |
| 4,372,713 | 2/1983 | Kean | 406/172 |
| 4,459,140 | 7/1984 | Kuban et al. | 55/356 |
| 4,695,205 | 9/1987 | Levine | 406/38 |
| 4,723,969 | 2/1988 | Demarco | 55/429 |
| 4,820,315 | 4/1989 | Demarco | 55/429 |

FOREIGN PATENT DOCUMENTS

| | | | |
|---|---|---|---|
| 0004276 | 10/1979 | European Pat. Off. | |
| 0065624 | 12/1982 | European Pat. Off. | 15/340.1 |
| 119517 | 10/1978 | Japan . | |
| 53-119519 | 10/1978 | Japan | 414/467 |
| 119520 | 10/1978 | Japan . | |
| 806825 | 2/1981 | U.S.S.R. | |
| 2028759 | 3/1980 | United Kingdom | 15/340.1 |

OTHER PUBLICATIONS

"J & L Vacuum Pneumatic, the Choice of the Industry", J & L Tank, Inc., date unknown.
"Vacuum Pneumatic Semi-Trailer 1300 cu.ft./1600 cu.ft., It's a Beall Custom", Trans. Beall Liner., date unknown.
"Looking for More Dry Bulk Business?", Heil, date unknown.
"Fact: Tank Trainer, Inc. Can Modify Your Pneumatic Trailer into a True Vac-Tank for Less . . . ", Tank Trailer, Inc., 1988.

Primary Examiner—Robert A. Dawson
Assistant Examiner—Joseph Drodge
Attorney, Agent, or Firm—Merchant, Gould, Smith, Edell, Welter & Schmidt

[57] ABSTRACT

A system for separating particulate matter from an airstream during pneumatic loading of a tank is disclosed. The system includes a compact filter unit that can be housed within the periphery of a standard manhole in the tank of a pneumatic truck trailer. The system further includes a canister to protect the filter, and a means of storing extra filter units within the interior of the tank.

9 Claims, 4 Drawing Sheets

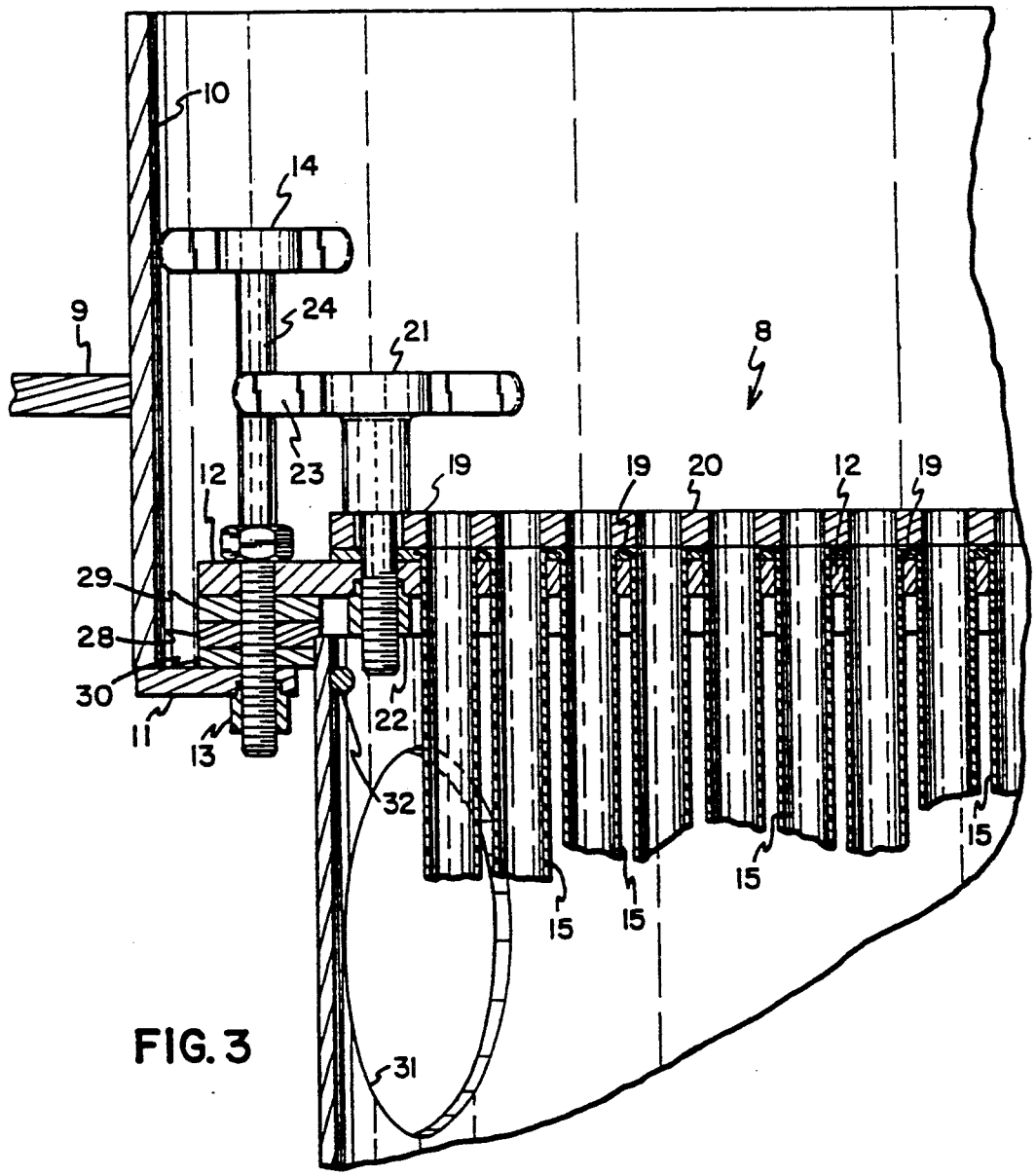
FIG. 3
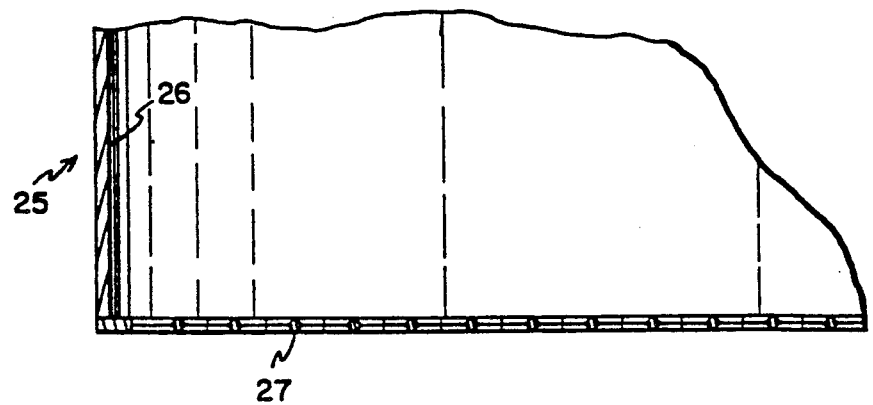

5,073,259

MANHOLE MOUNTED FILTERING SYSTEM FOR SELF-LOADING SEMI-TRAILER

This is a continuation, of application Ser. No. 07/378,021, filed July 11, 1989, now abandoned.

The present invention relates to mechanisms for loading particulate matter into a pneumatic trailer.

BACKGROUND

It is known to load particulate matter from one container to another pneumatically, i.e., through the use of a stream of air. Such systems are commonly used, for example, to load particulate matter into the pneumatic tank of a truck trailer from another vessel, such as a railroad car. The types of materials that can be loaded in this way include flour, grain, fertilizer, plastic pellets, and so on.

Typically, the pneumatic trailers that are used in these systems have a positive displacement pump attached thereto. The vacuum side of this pump is fluidly attached to the interior of the trailer tank, while the trailer tank is itself fluidly connected to the rail car.

In use, the pump partially evacuates the trailer tank. The lower-than-atmospheric pressure in the trailer tank in turn draws a stream of air and particulate matter into the tank from the rail car. Systems of this type typically employ vacuum pumps that operate in the range of 400-800 cubic feet per minute. The systems are typically able to fill a trailer tank of 1600 cubic feet in 1 hour.

It is in the nature of these systems that the air withdrawn from the truck tank by the positive displacement pump during loading has a large amount of particulate matter suspended therein. This suspended particulate matter must be removed during the loading operation, because not doing so would cause unacceptable damage to the displacement pump as well result in an unacceptable loss of the product being unloaded from the rail car.

Prior commercial pneumatic loading systems having generally used cyclones, filters, or a combination of these devices to perform this separating function. The separating devices are generally disposed in the fluid pathway between the trailer tank and the displacement pump. They generally have had complicated flow patterns, and have used bulky components.

These basic flaws have resulted in a number of corollary problems. For example, the separating devices of the prior commercial systems generally have been expensive to produce. Moreover, their size has dictated that they be outside the trailer tank, generally at the back of the trailer. This, in turn, places the separating devices at a long distance from the displacement pump, which is typically located at the front of the trailer, thus requiring more tubing and resulting in a greater head loss of the supply vacuum.

As an additional difficultly, these prior separating systems have been difficult to clean. Since the separating systems must be cleaned between loads of different materials, this difficulty has posed logistical problems. For example, appropriate facilities to clean the separating system would have to exist at each loading site, if dissimilar loads are carried on each leg of a two-way journey.

It is therefore an object of the present invention to solve these and other associated difficulties that have heretofore existed with known pneumatic loading devices.

In order to achieve this and other objectives, the present invention provides a filter unit within the interior of the tank of the truck trailer. Preferably, the filter unit, along with its associated mounting and protective hardware, is disposed entirely within the circumference of one of the standard manholes of the tank.

While in its broader aspect the invention can use any filter media, the invention also includes providing an improved arrangement of mounting standard, commercially available filtering media within the unit. Consequently, the unit is more compact than the typical separating filters that have been used in this type of application previously.

When the filter unit is arranged in this way, the accumulated particulate matter that is separated by the filtering media falls directly back into the truck tank under the action of gravity, without the need of conduits or other devices to convey the collected matter from the separating system to the tank. This results in the present system being simpler than prior systems, with lower material costs. Because the separating system is disposed almost entirely within the tank, it places no additional demands on the overall size of the truck trailer. Moreover, the separating system can be placed near the front of the tank, closer to the vacuum pump, than can the typical prior-art system, reducing the length of the fluid conduit and thereby further increasing the efficiency of the device and further reducing the material costs. Still further, the compactness of the system allows the typical installation to include mechanisms to store spare, clean filter units in additional manholes, making on-site cleaning and changing of the filter system more practical.

With these and other aspects of the present invention in mind, there will now be described a particular embodiment. It should of course be borne in mind that this description is one of example only, and that the described embodiment should not be taken as unjustly limiting the scope the appended claims.

BRIEF DESCRIPTION OF THE DRAWINGS

FIG. 3 is a partial cross-sectional view of one of the filter units.

DETAILED DESCRIPTION OF THE DRAWINGS

Figure 1:
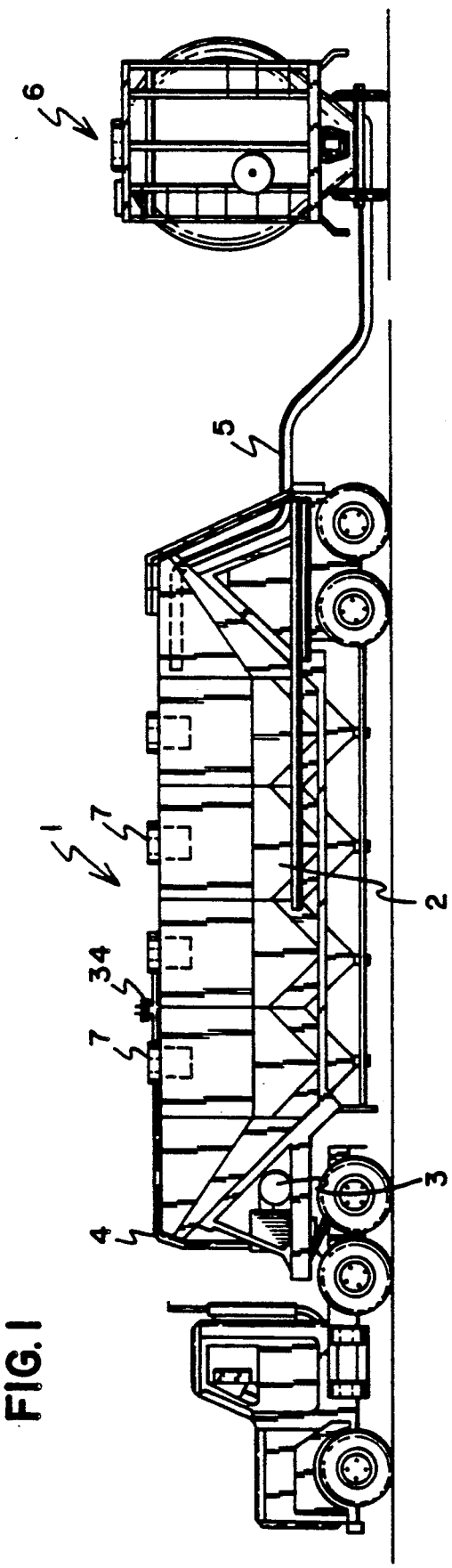
FIG. 1 is a schematic view of the overall configuration of one embodiment of the present invention.

The overall configuration of one embodiment of the present invention is shown in schematic in FIG. 1. That figure illustrates a pneumatic truck trailer (1), which includes an airtight storage tank (2). At the forward end of the trailer is a positive displacement pump (3) whose vacuum side is connected via a pipe (4) to the interior of the tank (2). At the rear end of the trailer (1) is a second pipe (5) that fluidly connects the interior of the tank (2) with the interior of the vessel that is to be unloaded, such as the illustrated rail car (6). As will be appreciated, the pneumatic tank (2) is of a generally standard configuration, and includes one or more standard manholes (7) through which access may be gained into the interior of the tank.

Figure 2:
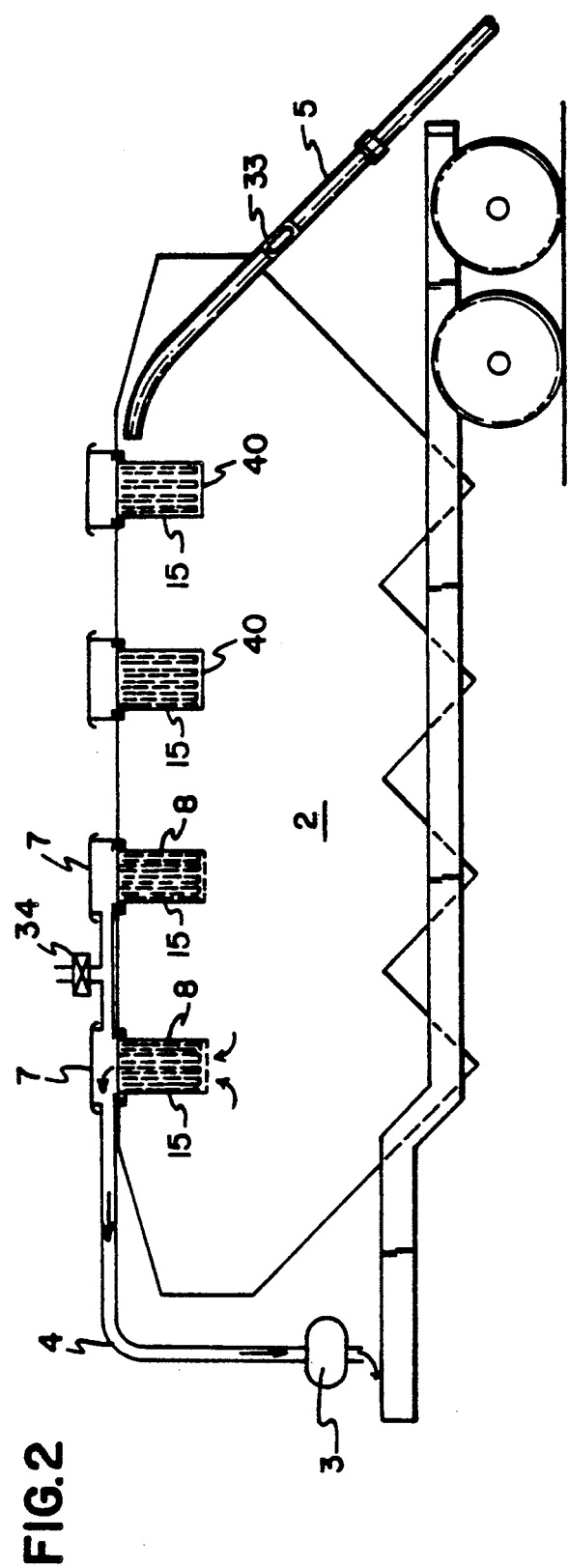
FIG. 2 is a schematic view showing the pneumatic tank and related features in greater detail than FIG. 1.

As is shown schematically in FIG. 2, the preferred embodiment of the present invention contemplates providing one or more filter units (8) that each can be mounted in the standard manholes (7) of the tank (2). The filter units are disposed between the interior of the tank (2) and outlet pipe (4), so that particulate-laden fluid leaving the interior of the tank (2) must pass through one of the filter units before reaching vacuum pump (3).

In general operation, once the tank (2) is brought into physical proximity with the rail car (6), the pipe (5) is put in place to fluidly connect the interior of the rail car with the interior of the tank. The vacuum pump (3) is then activated to partially evacuate the interior of the tank. This partial vacuum in turn draws a stream of air and entrained particulate matter from the interior of the rail car, through pipe (5), and into the interior of the tank (2). At this point, the velocity of the airstream decreases due to the larger cross-sectional area of the flow pattern in the interior of the tank compared with the interior of pipe (5). As a result of this slowing, a large portion of the entrained particulate matter falls out of the airstream and collects inside the tank (2).

The pump (3) continues to draw air out of the tank until all of the particulate matter is withdrawn from the rail car, or the tank is full. A sight glass (33) is provided in pipe (5) to determine when the airstream no longer contains any suspended particulate, and to check to condition of the fluid flow during loading. During the process of loading, a portion of the transferred particulate matter remains entrained in airstream as it is drawn up to the filter units (8) in preparation for being drawn through pipe (4). The filter units (8) separate these particles from the airstream and collect them on the filter media. As this collection progresses, the accumulated particles will tend to fall under the influence of gravity down from the filter units into the bottom of the tank (2).

If this gravity-influenced process is not enough to remove the collected particles adequately, a valve (34) in pipe (4) can be opened briefly. This allows the pressure in the pipe (4) to quickly rise to near atmospheric levels, causing a sudden backflow through the filter units (8) into the interior of the tank. This backflow has proven to loosen the accumulated particulate from the surface of the filter media and thereby assist in additional cleaning.

Describing now one of the filter units (8) in greater detail, there is illustrated in FIG. 3 one such filter unit and the surrounding structures of the tank (2). It should be appreciated that the illustrated structures are symmetrical about the center line of the manhole and that, therefore, the partial view in FIG. 3 largely fully describes the structures of the filter unit.

Illustrated in FIG. 3 is a portion of the upper wall (9) of the tank (2), along with the portion of the cylindrical wall (10) of the manhole. The manhole wall terminates at its lower edge with a mounting lip (11), which is annular and runs continuously around the lower edge of the manhole wall. The filter unit (8) includes a circular main plate (12) that is large enough to overlap the mounting lip (11) at its periphery, as illustrated. This main plate is pierced along that overlapping periphery with a plurality of apertures. The apertures in the main plate are aligned with corresponding apertures in mounting lip (11), which have either been threaded themselves or provided with a hardened, internally-threaded insert (13) as illustrated. An externally-threaded mounting handle (14) extends through each of these apertures and threadably engages threaded insert (13), to thereby secure the main plate (12) to the mounting lip (11).

The filtering media in the illustrated filter unit are filtering tubes (15), although it should be understood that any suitably compact filter medium will be sufficient for the broader aspects of the invention. The filtering tubes (15) are commercially available in standard lengths. They are circular in cross section and have wall thickness of approximately 1/16 of an inch. When purchased, they have a flange at one end and are crimped shut at the other. As can be seen readily in FIG. 3, the filter tubes (15) are arranged in a close-packed array such that each tube is essentially vertically aligned through a corresponding aperture in main plate (12).

Figure 5:
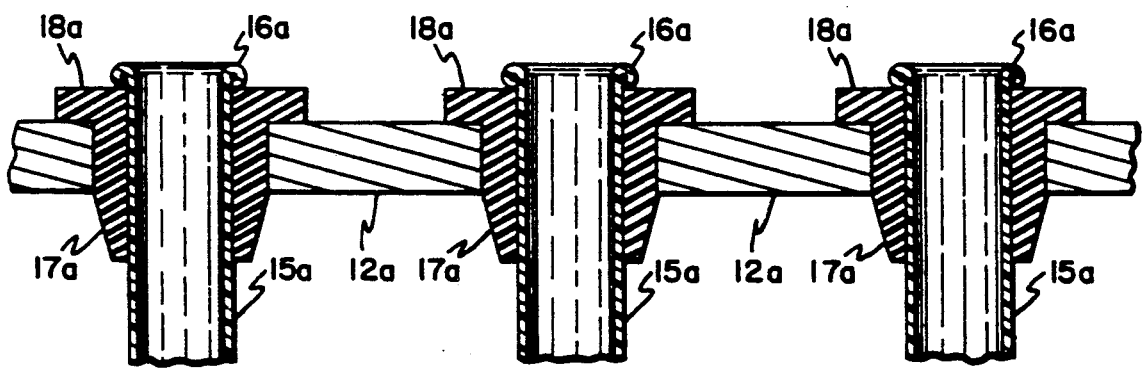
FIG. 5 is a cross-sectional detail of a prior-art arrangement of securing the filter media in the filter unit.

Referring now to FIG. 5, there is illustrated a method of securing such filter tubes to the main plate of a filtering unit that has been typical in the prior art. In that arrangement, the commercially-available filter tube (15a) with its relatively large standard flange (16a) have been inserted through an annular rubber gasket (17a), which itself has a flange (18a) at its end. The assembly of the standard filter tube and annular gasket has then been placed through a relatively large-diameter aperture in main plate (12a).

This prior-art method of securing filtering tubes to a main plate has heretofore been required, as the outer dimension of the filter tube is usually increased somewhat at the end that is crimp sealed. Consequently, an aperture in the main plate (12a) large enough to allow this crimped end to pass therethrough is too large to firmly hold the smaller, normal outer diameter of the filter tube. Resilient annular gasket (17a) is therefore provided because it will deform sufficiently to allow the enlarged end of the filter tube to be inserted therethrough, and at the same time it will return to a shape that will grip the normal diameter of the filter tube. This assembly of the gasket and the filter tube is then inserted into the aperture in main plate (12a).

This prior-art arrangement, however, has several drawbacks. First, the filter tube (15a) is held in main plate (12a) only via the frictional fit between main plate (12a) and gasket (17a), and between gasket (17a) and filter tube (15a). If the filter media becomes plugged, or the vacuum on the downstream side of the filter tubes (15a) becomes too great for any other reason, the gasket and/or filter tube illustrated in FIG. 5 can pop out of the main plate. This, of course, results in the corresponding failure of the filter unit.

Furthermore, the prior-art arrangement has not resulted in an efficient packing of the filter tubes. Considerations of fluid and particle mechanics, when taken alone, would permit the filter tubes to be packed more tightly than the above-described prior-art method of securing them has allowed. The reduction in the overall size of the prior-art filter units, therefore, has been limited largely by the inability to secure the filter tubes tightly in a small space.

The preferred embodiment of the present invention provides a solution to this problem. According to that embodiment, as is shown in detail in FIG. 6, the apertures in the main plate (12) are of a size that is very close to the normal outside diameter of filter tube (15). The preferred embodiment also includes a gasket (19) that is made of a suitable resilient material. The gasket (19) has therein apertures that correspond in position to the apertures in the main plate (12). The apertures in the gasket, however, are somewhat smaller in diameter that the normal outside diameter of filter tubes (15), but large enough so that the material of the gasket can deform sufficiently to allow the filter tubes to be passed therethrough in the manner described below.

Disposed above the gasket (19) is a retaining plate (20), which also has a number of apertures therein that correspond in location to the apertures in the gasket (19) and the main plate (12). The apertures in the retaining plate (20) are of a diameter that is no larger than the inside diameter of the filter tubes (15).

Figure 6:
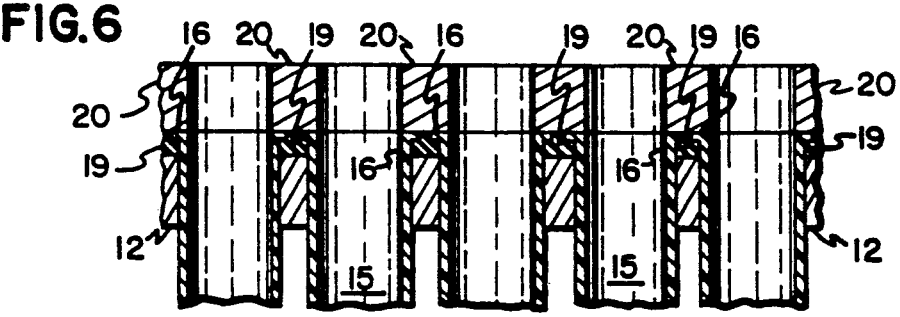
FIG. 6 is a cross-section detail, corresponding to FIG. 5, showing the preferred arrangement of securing the filter media in the filter unit of the present invention.

The elements of the preferred embodiment are assembled by first cutting off the large, commercially-supplied flange from the end of filter tubes (15). The tubes are then inserted upward through the main plate (12) and the gasket (19). Following this step, the filtering tubes (15) are reworked to have thereon a small flange (16), which is shown in FIG. 6. The retaining plate (20) is then placed over the now-flanged ends of the filter tubes (15). The entire assembly is then secured together by assembling handles (21), as shown in FIG. 3, which extend through suitable apertures in retaining plate (20) and threadably engage either main plate (12) or a hardened, threaded insert (22) in main plate (12) as illustrated.

As these assembly handles are tightened, they squeeze the retaining plate (20) and cover plate (12) together, thereby compressing the resilient gasket (19) and causing it to expand in a lateral direction to sealingly engage the outer surfaces of filter tubes (15). In this way, the filter tubes (15) are positively prevented from being withdrawn upward by the vacuum because of the interference between the tube and retaining plate (20).

Furthermore, the illustrated assembly for securing each filter tube (15) has a much smaller diameter than that exemplified by the prior art in FIG. 5. This allows the present invention to secure a given amount of filter media (i.e. a certain number of filter tubes of a given length) in a filter unit (8) that is much smaller than has heretofore been possible. For example, filter units made according to the above-described prior-art construction have typically been in the size range of 32-38 inches in diameter. In contrast, the filter unit made according to the preferred embodiment of the present invention is able to deploy the same filter media in an array that is 16 inches in diameter.

This increased compactness has been an important factor in allowing the present invention to dispose a filter unit incorporating commercial filter tubes within a standard manhole. Since the circumferential wall of a standard manhole is approximately 20 inches in diameter, it can be readily appreciated that the prior-art arrangement presented a serious obstacle. The commercial filter tube array of the present invention is compact enough to not only be placed within the manhole, but also to leave room for other related structures that further enhance the utility of the invention.

Figure 4:
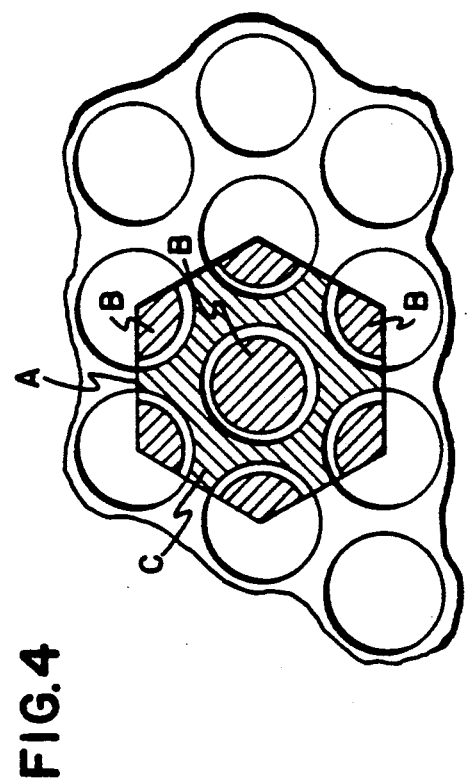
FIG. 4 shows in plan form the arrangement of the apertures in the filter unit through which the filter media extend.

The preferred securing arrangement of the present invention, in fact, has allowed the filter tubes to be packed in an array in which the total internal cross-sectional area of the filter tubes is very nearly equal to the total cross-sectional area of the webbing of main plate (12). This is shown graphically in FIG. 4, in which one unit of the array of filter tube apertures has been enclosed by a line (A). The areas (B) represent the portion of the region enclosed by line (A) that is taken up by the interior of the filter tubes. The areas (C) represent the portion of the enclosed region that is taken up by the solid webbing of the main plate (12). In the preferred embodiment, the areas (B) and (C) are nearly equal in size.

Figure 7:
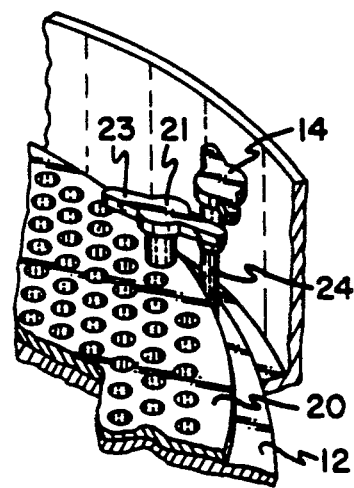
FIG. 7 is a perspective view of a detail of the filter unit.

The present invention also includes a series of features that prevent the filtering unit from being inadvertently disassembled during removal from the manhole. As can be seen in FIG. 7, the assembly handle (21) includes one or more projections (23), which an operator can grasp to apply torque to the handle. Each assembly handle on the filter unit is located in close proximity to a mounting handle (14). Moreover, as can be seen in FIG. 3, the mounting handles (14) include an elongated shaft (24).

Each assembly handle is separated from the associated mounting handle by a distance that is less than the distance that the projection (23) extends from the center line of the assembly handle. This arrangement functions to make it intuitively clear to an operator which handle he or she should loosen in order to remove the filter unit from the manhole. As shown in both FIGS. 3 and 7, when the filter unit is installed in a manhole, the assembly handle (21) cannot be rotated, because the projections (23) interfere with shaft (24). In this way, operators unfamiliar with the internal structure of the filter unit who intend to remove the unit from the manhole are prevented from inadvertently disassembling the retaining plate (20) from the main plate (12). Once the mounting handles (14) are removed, the filter unit can be grasped by assembling handles (21) and removed from the manhole.

The present invention also includes a canister structure (25) that encloses the filter unit (8) within the interior of pneumatic tank (2). This canister includes a cylindrical wall (26), which extends around the periphery of the array of filter tubes (15) and extends downward past the lower ends of the filter units.

The bottom of cylindrical wall (26) is enclosed by screen (27). This screen preferably has apertures therein that are sufficiently large to let the airstream pass freely upward to the filter tubes (15), but also has a mesh size that is small in relation to the physical dimensions of the filter tubes. As illustrated, screen (27) can be conveniently constructed of an expanded metal.

The upper edge of the cylindrical wall (26) terminates in a radially outward-extending flange (28). This flange has the same outside diameter as does main plate (12), and it is pierced by a series of apertures that are aligned with the apertures in main plate (12) and mounting lip (11) through which the shaft of mounting handle (14) extends. Sandwiched between the flange (28) and the mounting lip (11), and between flange (28) and the main plate (12) are a pair of gaskets (29, 30), which are made of a resilient material suitable to sealingly engage the surfaces of these elements when compressed by mounting handle (14).

A bead (32) is secured to the interior surface of the cylindrical wall (26) near the top thereof. This bead provides a surface that an operator can grasp to withdraw the filter canister from the manhole after removing the filter unit (8).

The filter canister should also preferably include one or more secondary inlet apertures (31), such as is illustrated in FIG. 3. These secondary inlets are located near the top of cylindrical wall (26) and are located on the side of the canister that points away from the outlet of the inlet conduit (5).

The filter canister serves to protect the filtering unit during loading, and from sudden shifts in the loaded particulate matter, as often happens during the initial movements of the trailer after loading, before the contents have settled. These sudden shifts generally occur as the trailer is braking to a halt, and the secondary inlets (31) should therefore be placed on the forward-facing surface of the canister.

The canister also serves to prevent the filter units from being buried by the product as the tank becomes nearly full. If the tank should become so full the bottom of the canister becomes covered, the filter unit will continue to operate as the entering airstream will then pass through secondary inlets (31). Additionally, the perforated bottom of the canister prevents any pieces of broken filter media from contaminating the loaded product.

The filter canister of the present invention can also be readily modified to become a storage compartment (40) for spare filter units. By replacing the lower screen (27) with a solid expanse of material and omitting the secondary inlets (31), the interior of the canister becomes isolated from the interior of the pneumatic tank (2). Such a modified canister can be mounted in a spare manhole of the tank, as shown in FIGS. 1 and 2, and a new filter unit (8) can be placed inside of it.

In practice, may be possible that some leakage should occur past gasket (30) of the storage compartment during unloading or loading. This has potential for leaving the interior of the storage compartment at a pressure that is different from ambient at the end of the procedure. To alleviate this problem, there can be provided a filter unit (not shown) in the side wall of the storage compartment, through which the interior of the compartment can be in fluid contact with the interior of the tank (2), but which will prevent any product from contaminating the interior of the compartment. This filter can employ the same media as the filter tubes, or another media if desired.

Then, if one of the filter units in use should need to be replaced, as for example if a filter unit should become damaged or if a clean filter unit is required because of a change of product during a two-way haul, it is a simple matter to remove the spare filter unit from the storage canister and switch it with the filter unit that is to be replaced. The contaminated or broken filter unit can then be carried safely on the same truck trailer in the storage canister back to a central location, where it can be cleaned or repaired without risking contamination of the product load.

Now, having described the particulars of the preferred embodiment of the present invention, it should be readily apparent to one of skill in the art that various changes can be made in the specific structures described without departing from the principles of the present invention. For example, the system just described also can be used when loading a pneumatic trailer at pressures above ambient. In such an arrangement, the fluidized product is forcibly blown through pipe (5) under compression into tank (2). The airstream is then filtered prior to its escape by opening valve (34), or even opening the cover from one or more manholes.

With the possibility of these various modifications in mind,

I claim:

1. An apparatus for evacuating the interior of a tank during a procedure of pneumatically loading particulate material into the tank, comprising:

a vacuum pump;

means for connecting the vacuum pump to an interior of the tank such that the pump withdraws air from the tank via a stream of fluid; and at least a first filter unit located within the fluid stream between the tank and the vacuum pump for removing particulate matter from the fluid stream and returning it to the tank, the filter unit being physically located within the tank;

wherein the tank includes at least one standard manhole therein having a diameter of approximately twenty (20) inches, said filter unit being designed, sized and arranged to be located entirely within the periphery of said standard manhole.

2. An apparatus as defined in claim 1, further comprising a canister that surrounds sides and bottom of the filter unit, thereby separating the filter unit form the interior of the tank.

3. An apparatus for evacuating the interior of a tank during a procedure of pneumatically loading particulate material into the tank, comprising:

a vacuum pump;

means for connecting the vacuum pump to the interior of the tank such that the pump withdraws air from a first tank via a stream of fluid;

at least one filter unit located within the fluid stream between the tank and the vacuum pump for removing particulate matter from the fluid stream and returning it to the tank, the filter unit being physically located within the tank; and further comprising a canister that surrounds sides and bottom of the filter unit, thereby separating the filter unit from the interior of the tank; wherein the tank has a manhole therein and the canister and filter unit are located within the periphery of the manhole.

4. An apparatus as defined in either one of claims 2 or 3, in which the filter unit employs a filter media, and a portion of the canister that encloses the bottom of the filter unit has apertures therein that are large enough to let the fluid stream pass therethrough, but small enough to prevent passage of fragments of the filter media into the interior of the tank.

5. An apparatus as defined in claim 4, in which the portion of the canister that encloses the sides of the filter unit has at least one secondary aperture therein, to allow the interior of the canister to continue to be in fluid communication with the interior of the tank when the portion of the canister that covers the bottom of the filter unit is buried by particulate material.

6. An apparatus as defined in either one of claims 2 or 3, in which the tank has at least two manholes therein, and the apparatus further comprises at least one storage canister and at least one spare filter unit, the storage canister being located in one of the manholes, and the spare filter unit being located in the storage canister, the storage canister being of a configuration sufficient to prevent passage of particulate between the interior of the storage canister and the interior of the tank, the spare filter unit being interchangeable with the first filter unit.

7. An apparatus as defined in either one of claims 1 or 3, in which the filter unit comprises a filter media, and wherein a cross-sectional area through the filter unit that is upstream of the filter media is approximately equal to a cross-sectional area through the filter unit that is downstream of the filter media.

8. The apparatus defined in claim 7, in which the filter media are a plurality of filter tubes open at one end and closed at the other, with a flange being provided at the open end of the filter tubes, wherein the filter unit further comprises:
- a substantially horizontal main plate having a plurality of apertures therein,
- a gasket located above the main plate with apertures therein corresponding to the apertures in the main plate; and
- a retaining plate located above the gasket with apertures therein corresponding to the apertures in the main plate, the apertures in the retaining plate being smaller than an outside cross-sectional profile of the filter tubes,
- the filter tubes extending through the apertures in the main plate and the gasket, such that the gasket engages surfaces of the filter tubes to create an air-tight seal.

9. The apparatus defined in claim 8, in which the main plate, gasket, and retaining plate are assembled together by an assembling mechanism, and in which the main plate is secured to the manhole by a mounting mechanism, and in which physical dimensions of the assembling mechanism are related to distance between the assembling and mounting mechanisms such that the assembling mechanism cannot be manipulated to disassemble the retaining plate from the main plate until the mounting mechanism is manipulated to dismount the main plate from the manhole.

* * * * *